United States Patent
Shim

(10) Patent No.: US 7,611,439 B2
(45) Date of Patent: Nov. 3, 2009

(54) POWER TRAIN OF AUTOMATIC TRANSMISSION

(75) Inventor: Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 416 days.

(21) Appl. No.: 11/602,175

(22) Filed: Nov. 20, 2006

(65) Prior Publication Data

US 2008/0039267 A1    Feb. 14, 2008

(30) Foreign Application Priority Data

Aug. 14, 2006    (KR) .................... 10-2006-0076794

(51) Int. Cl.
*F16H 3/44* (2006.01)
(52) U.S. Cl. .................................... 475/280
(58) Field of Classification Search ......... 475/275–290, 475/330
See application file for complete search history.

(56) References Cited

U.S. PATENT DOCUMENTS

| | | | | |
|---|---|---|---|---|
| 2,890,603 A * | 6/1959 | Miller et al. ................. | 475/134 |
| 7,041,027 B2 * | 5/2006 | Bucknor et al. ............. | 475/275 |
| 7,291,084 B2 * | 11/2007 | Park ........................... | 475/275 |
| 7,311,635 B2 * | 12/2007 | Klemen ...................... | 475/286 |
| 7,384,364 B2 * | 6/2008 | Jang ............................ | 475/275 |
| 7,455,614 B2 * | 11/2008 | Seo et al. ..................... | 475/280 |

* cited by examiner

*Primary Examiner*—Roger L Pang
*Assistant Examiner*—Justin Holmes
(74) *Attorney, Agent, or Firm*—Morgan, Lewis & Bockius LLP

(57) ABSTRACT

A power train of an automatic transmission realizing seven forward speeds and three reverse speeds includes an input shaft, an output gear, a transmission case, a speed reduction unit, an output unit, a first clutch, a second clutch, a third clutch, a fourth clutch, a first brake, and a second brake.

The output unit includes variable input members and variably stopped members. the variable input members and variably stopped members are controlled by the clutches to realize seven forward speed and three reverse speeds at the output unit.

4 Claims, 12 Drawing Sheets

FIG. 11

| shift speed | C1 | C2 | C3 | C4 | B1 | B2 | speed ratio | step ratio |
|---|---|---|---|---|---|---|---|---|
| D1 | ● | | | | | | 4.63 | |
| D2 | | ● | | | ● | | 2.79 | 1.66 |
| D3 | | | ● | | ● | | 1.86 | 1.50 |
| D4 | | | ● | ● | ● | | 1.30 | 1.43 |
| D5 | | ● | | ● | | | 1.00 | 1.30 |
| D6 | | | | ● | | | 0.85 | 1.18 |
| D7 | ● | | | ● | | | 0.76 | -1.12 |
| REV. 1 | ● | | | | | ● | -4.71 | |
| REV. 2 | | ● | | | | ● | -2.84 | 6.09 |
| REV. 3 | | | ● | | | ● | -1.89 | |

Zr1/Zs1=1.52, Zr2/Zs2=2, Zr3/Zs3=1.89, Zr4/Zs4=3.36

POWER TRAIN OF AUTOMATIC TRANSMISSION

CROSS-REFERENCE TO RELATED APPLICATION

This application claims priority to and the benefit of Korean Patent Application No. 10-2006-0076794 filed in the Korean Intellectual Property Office on Aug. 14, 2006, the entire contents of which are incorporated herein by reference.

BACKGROUND OF THE INVENTION (a) Field of the Invention

The present invention relates to a power train of an automatic transmission. More particularly, the present invention relates to a power train of an automatic transmission that realizes seven forward speeds and three reverse speeds.

(b) Description of the Related Art

A typical shift mechanism of an automatic transmission utilizes a combination of a plurality of planetary gear sets. A power train of such an automatic transmission that includes the plurality of planetary gear sets changes rotating speed and torque received from a torque converter of the automatic transmission, and accordingly transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a power train such as durability, efficiency in power transmission, and size depend a lot on the layout of combined planetary gear sets. Therefore, designs for a combining structure of a power train are also under constant investigation.

A manual transmission that has too many speeds causes the inconvenience of excessively frequent shifting operations by the driver. Therefore, the positive features of more shift-speeds are more important for automatic transmissions because an automatic transmission automatically controls shifting operations basically without needing any manual operation.

As more speeds in an automatic transmission are realized, a power train that can easily skip up-shift and skip down-shift as well as normally up-shift and down-shift is required.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a power train of an automatic transmission having advantages including realizing seven forward speeds and three reverse speeds, and also facilitating skip up-shifting and skip sown-shifting.

Exemplary power trains of an automatic transmission according to embodiments of the present invention may include: an input shaft; an output gear; a transmission case; a speed reduction unit including a fixed input member that is fixedly connected to the input shaft, a fixedly stopped member that is fixedly connected to the transmission case, and first and second reduced speed output members that respectively output first and second reduced rotational speeds; an output unit including a first variable input member that is variably connected to the first and second reduced speed output members and the input shaft, a second variable input member that is variably connected to the input shaft, first and second variably stopped members that are variably connected to the transmission case, and a shift speed output member that always acts as an output member by being fixedly connected to the output gear, wherein the output unit generates seven forward speeds and three reverse speeds at the shift speed output member by operations of the first and second variable input members and the first and second variably stopped members; a first clutch for variably connecting the first variable input member to the first reduced speed output member; a second clutch for variably connecting the first variable input member to the second reduced speed output member; a third clutch for variably connecting the first variable input member to the input shaft; a fourth clutch for variably connecting the second variable input member to the input shaft; a first brake for variably connecting the first variably stopped member to the transmission case; and a second brake for variably connecting the second variably stopped member to the transmission case.

According to a first exemplary embodiment of the present invention, the speed reduction unit may include: a first planetary gear set having a first sun gear, a first planet carrier, and a first ring gear as operational members thereof; and a second planetary gear set having a second sun gear, a second planet carrier, and a second ring gear as operational members thereof, wherein the second ring gear is operated as the fixed input member, the first sun gear is operated as the fixedly stopped member, the first planet carrier is operated as the first reduced speed output member, the first ring gear is operated as the second reduced speed output member, the first ring gear is fixedly connected to the second planet carrier, and the second sun gear is fixedly connected to the first sun gear.

The output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is operated as the first variable input member, the third planet carrier is operated as the second variable input member, the fourth sun gear is operated as the first variably stopped member, at least one of the fixedly connected third planet carrier and the fourth ring gear is operated as the second variably stopped member, and at least one of the fixedly connected fourth planet carrier and the third ring gear is operated as the shift speed output member.

The first, second, third, and fourth planetary gear sets may be disposed in a sequence of the first planetary gear set, the second planetary gear set, the third planetary gear set, and the fourth planetary gear set.

The input shaft and the output gear may be disposed on the same side.

The first and second clutches may be disposed on an opposite side to the output unit with reference to the speed reduction unit, and the third and fourth clutches may be disposed between the speed reduction unit and the output unit.

According to a second exemplary embodiment of the present invention, the speed reduction unit may include: a first planetary gear set having a first sun gear, a first planet carrier, and a first ring gear as operational members thereof; and a second planetary gear set having a second sun gear, a second planet carrier, and a second ring gear as operational members thereof, wherein the second sun gear is operated as the fixed input member, the first sun gear is operated as the fixedly stopped member, the first planet carrier is operated as the first reduced speed output member, the first ring gear is operated as the second reduced speed output member, the first planet carrier is fixedly connected to the second ring gear, and the second planet carrier is fixedly connected to the first ring gear.

The output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is operated as the first variable input member, the third planet carrier is operated as the second variable input member, the fourth sun gear is operated as the first variably stopped member, at least one of the fixedly connected third planet carrier and the fourth ring gear is operated as the second variably stopped member, and at least one of the fixedly connected fourth planet carrier and the third ring gear is operated as the shift speed output member.

The first, second, third, and fourth planetary gear sets may be disposed in a sequence of the first planetary gear set, the second planetary gear set, the third planetary gear set, and the fourth planetary gear set.

The input shaft and the output gear may be disposed on the same side.

The first and second clutches may be disposed on an opposite side to the output unit with reference to the speed reduction unit, and the third and fourth clutches may be disposed between the speed reduction unit and the output unit.

According to a third exemplary embodiment of the present invention, the speed reduction unit may include a compound planetary gear set having a long-pinion-side ring gear, a short-pinion-side ring gear, a compound planet carrier, and a compound sun gear as operational members thereof, wherein the long-pinion-side ring gear is operated as the fixed input member, the compound sun gear is operated as the fixedly stopped member, the compound planet carrier is operated as the first reduced speed output member, and the short-pinion-side ring gear is operated as the second reduced speed output member.

The output unit may include: a first planetary gear set having a first sun gear, a first planet carrier, and a first ring gear as operational members thereof; and a second planetary gear set having a second sun gear, a second planet carrier, and a second ring gear as operational members thereof, wherein the first sun gear is operated as the first variable input member, the first planet carrier is operated as the second variable input member, the second sun gear is operated as the first variably stopped member, at least one of the fixedly connected first planet carrier and the second ring gear is operated as the second variably stopped member, and at least one of the fixedly connected first ring gear and the second planet carrier is operated as the shift speed output member.

The compound planetary gear set and the first and second planetary gear sets may be disposed in a sequence of the compound planetary gear set, the first planetary gear set, and the second planetary gear set.

The input shaft and the output gear may be disposed on the same side.

The first and second clutches may be disposed on an opposite side to the output unit with reference to the speed reduction unit, and the third and fourth clutches may be disposed between the speed reduction unit and the output unit.

According to a fourth exemplary embodiment of the present invention, the speed reduction unit may include a Ravigneaux planetary gear set having a Ravigneaux ring gear, a Ravigneaux planet carrier, a long-pinion-side sun gear, and a short-pinion-side sun gear as operational members thereof, wherein the long-pinion-side sun gear is operated as the fixed input member, the short-pinion-side sun gear is operated as the fixedly stopped member, the Ravigneaux planet carrier is operated as the first reduced speed output member, and the Ravigneaux ring gear is operated as the second reduced speed output member.

The output unit may include: a first planetary gear set having a first sun gear, a first planet carrier, and a first ring gear as operational members thereof; and a second planetary gear set having a second sun gear, a second planet carrier, and a second ring gear as operational members thereof, wherein the first sun gear is operated as the first variable input member, the first planet carrier is operated as the second variable input member, the second sun gear is operated as the first variably stopped member, at least one of the fixedly connected first planet carrier and the second ring gear is operated as the second variably stopped member, and at least one of the fixedly connected first ring gear and the second planet carrier is operated as the shift speed output member.

The Ravigneaux planetary gear set and the first and second planetary gear sets may be disposed in a sequence of the Ravigneaux planetary gear set, the first planetary gear set, and the second planetary gear set.

The input shaft and the output gear may be disposed on the same side.

The first and second clutches may be disposed on an opposite side to the output unit with reference to the speed reduction unit, and the third and fourth clutches may be disposed between the speed reduction unit and the output unit.

According to a fifth exemplary embodiment of the present invention, the speed reduction unit may include: a first planetary gear set having a first sun gear, a first planet carrier, and a first ring gear as operational members thereof; and a second planetary gear set having a second sun gear, a second planet carrier, and a second ring gear as operational members thereof, wherein the second ring gear is operated as the fixed input member, the first sun gear is operated as the fixedly stopped member, the first planet carrier is operated as the first reduced speed output member, the first ring gear is operated as the second reduced speed output member, the first planet carrier is fixedly connected to the second planet carrier, and the first sun gear is fixedly connected to the second sun gear.

The output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is operated as the first variable input member, the third planet carrier is operated as the second variable input member, the fourth sun gear is operated as the first variably stopped member, at least one of the fixedly connected third planet carrier and the fourth ring gear is operated as the second variably stopped member, and at least one of the fixedly connected fourth planet carrier and the third ring gear is operated as the shift speed output member.

The first, second, third, and fourth planetary gear sets may be disposed in a sequence of the first planetary gear set, the second planetary gear set, the third planetary gear set, and the fourth planetary gear set.

The input shaft and the output gear may be disposed on the same side.

The first and second clutches may be disposed on an opposite side to the output unit with reference to the speed reduction unit, and the third and fourth clutches may be disposed between the speed reduction unit and the output unit.

According to a sixth exemplary embodiment of the present invention, the speed reduction unit is the same as the speed reduction unit of the first exemplary embodiment of the present invention.

According to the sixth exemplary embodiment of the present invention, the output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is operated as the first variable input member, the fourth planet carrier is operated as the second variable input member, the third ring gear is operated as the first variably stopped member, the third planet carrier is operated as the second variably stopped member, the fourth ring gear is operated as the shift speed output member, the third planet carrier is fixedly connected to the fourth planet carrier, and the third sun gear is fixedly connected to the fourth sun gear.

The first, second, third, and fourth planetary gear sets may be disposed in a sequence of the first planetary gear set, the second planetary gear set, the third planetary gear set, and the fourth planetary gear set.

The input shaft and the output gear may be disposed on the same side.

The first and second clutches may be disposed on an opposite side to the output unit with reference to the speed reduction unit, and the third and fourth clutches may be disposed between the speed reduction unit and the output unit.

According to a seventh exemplary embodiment of the present invention, the speed reduction unit is the same as the speed reduction unit of the second exemplary embodiment of the present invention.

According to the seventh exemplary embodiment of the present invention, the output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is operated as the first variable input member, the fourth planet carrier is operated as the second variable input member, the third ring gear is operated as the first variably stopped member, the third planet carrier is operated as the second variably stopped member, the fourth ring gear is operated as the shift speed output member, the third planet carrier is fixedly connected to the fourth planet carrier, and the third sun gear is fixedly connected to the fourth sun gear.

The first, second, third, and fourth planetary gear sets may be disposed in a sequence of the first planetary gear set, the second planetary gear set, the third planetary gear set, and the fourth planetary gear set.

The input shaft and the output gear may be disposed on the same side.

The first and second clutches may be disposed on an opposite side to the output unit with reference to the speed reduction unit, and the third and fourth clutches may be disposed between the speed reduction unit and the output unit.

According to an eighth exemplary embodiment of the present invention, the speed reduction unit is the same as the speed reduction unit of the third exemplary embodiment of the present invention.

According to the eighth exemplary embodiment of the present invention, the output unit may include: a first planetary gear set having a first sun gear, a first planet carrier, and a first ring gear as operational members thereof; and a second planetary gear set having a second sun gear, a second planet carrier, and a second ring gear as operational members thereof, wherein the first sun gear is operated as the first variable input member, the second planet carrier is operated as the second variable input member, the first ring gear is operated as the first variably stopped member, the first planet carrier is operated as the second variably stopped member, the second ring gear is operated as the shift speed output member, the first planet carrier is fixedly connected to the second planet carrier, and the first sun gear is fixedly connected to the second sun gear.

The compound planetary gear set and the first and second planetary gear sets may be disposed in a sequence of the compound planetary gear set, the first planetary gear set, and the second planetary gear set.

The input shaft and the output gear may be disposed on the same side.

The first and second clutches may be disposed on an opposite side to the output unit with reference to the speed reduction unit, and the third and fourth clutches may be disposed between the speed reduction unit and the output unit.

According to a ninth exemplary embodiment of the present invention, the speed reduction unit is the same as the speed reduction unit of the fourth exemplary embodiment of the present invention.

According to the ninth exemplary embodiment of the present invention, the output unit may include: a first planetary gear set having a first sun gear, a first planet carrier, and a first ring gear as operational members thereof; and a second planetary gear set having a second sun gear, a second planet carrier, and a second ring gear as operational members thereof, wherein the first sun gear is operated as the first variable input member, the second planet carrier is operated as the second variable input member, the first ring gear is operated as the first variably stopped member, the first planet carrier is operated as the second variably stopped member, the second ring gear is operated as the shift speed output member, the first planet carrier is fixedly connected to the second planet carrier, and the first sun gear is fixedly connected to the second sun gear.

The Ravigneaux planetary gear set and the first and second planetary gear sets may be disposed in a sequence of the Ravigneaux planetary gear set, the first planetary gear set, and the second planetary gear set.

The input shaft and the output gear may be disposed on the same side.

The first and second clutches may be disposed on an opposite side to the output unit with reference to the speed reduction unit, and the third and fourth clutches may be disposed between the speed reduction unit and the output unit.

According to a tenth exemplary embodiment of the present invention, the speed reduction unit is the same as the speed reduction unit of the fifth exemplary embodiment of the present invention.

According to the tenth exemplary embodiment of the present invention, the output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is operated as the first variable input member, the fourth planet carrier is operated as the second variable input member, the third ring gear is operated as the first variably stopped member, the third planet carrier is operated as the second variably stopped member, the fourth ring gear is operated as the shift speed output member, the third planet carrier is fixedly connected to the fourth planet carrier, and the third sun gear is fixedly connected to the fourth sun gear.

The first, second, third, and fourth planetary gear sets may be disposed in a sequence of the first planetary gear set, the second planetary gear set, the third planetary gear set, and the fourth planetary gear set.

The input shaft and the output gear may be disposed on the same side.

The first and second clutches may be disposed on an opposite side to the output unit with reference to the speed reduction unit, and the third and fourth clutches may be disposed between the speed reduction unit and the output unit. According to the exemplary embodiments of the present invention: the first clutch and the first brake are operated in a first forward speed, the second clutch and the first brake are operated in a second forward speed, the third clutch and the first brake are operated in a third forward speed, the fourth clutch and the first brake are operated in a fourth forward speed, the third and fourth clutches are operated in a fifth forward speed, the second and fourth clutches are operated in a sixth forward speed, the first and fourth clutches are operated in a seventh forward speed, the first clutch and the second brake are operated in a first reverse speed, the second clutch and the second brake are operated in a second reverse speed, and the third clutch and the second brake are operated in a third reverse speed.

FIG., 5 is a schematic diagram of a power train of an automatic transmission according to a fifth exemplary embodiment of the present invention.

Figure 6:
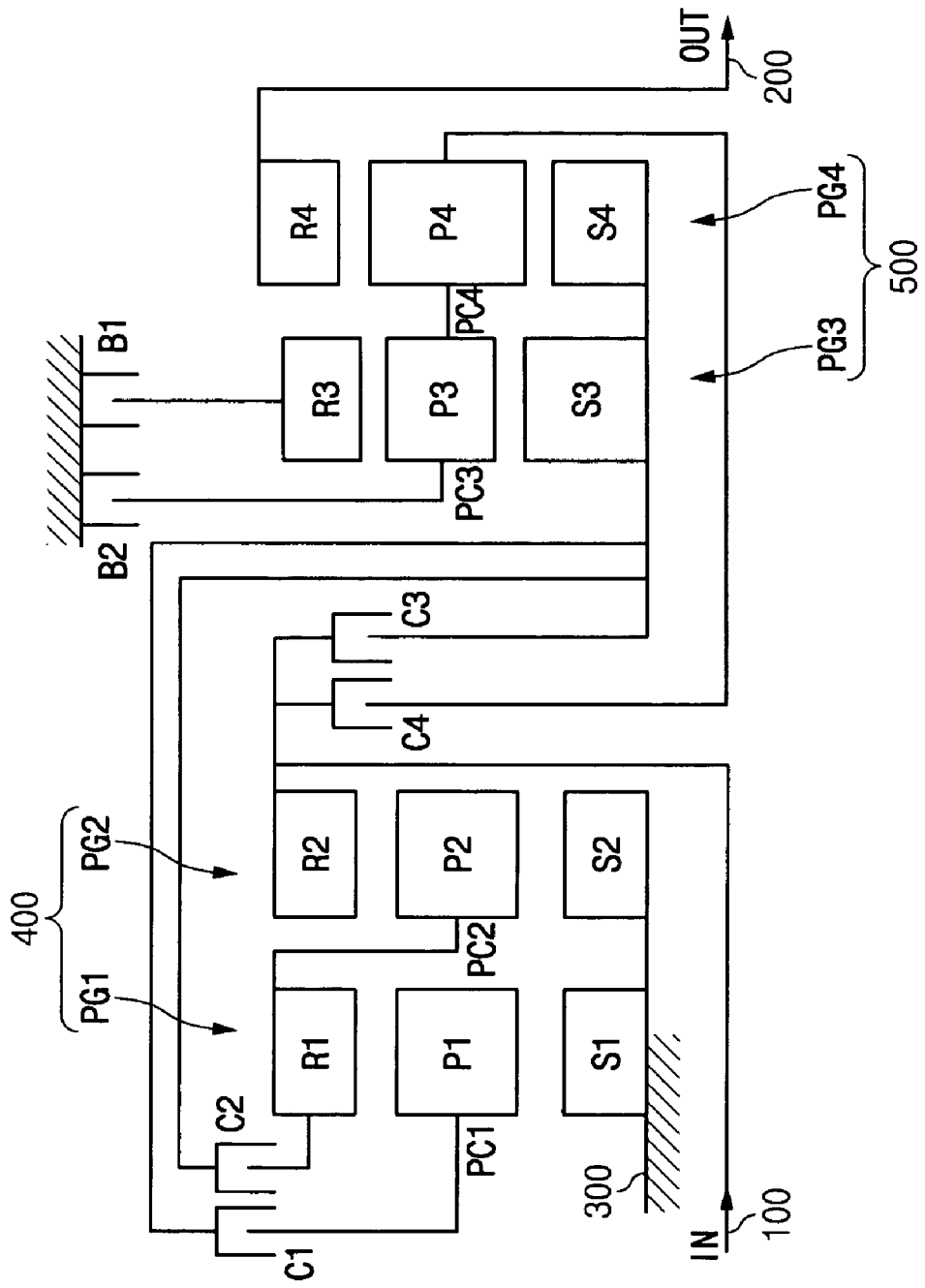

FIG. 6 is a schematic diagram of a power train of an automatic transmission according to a sixth exemplary embodiment of the present invention.

Figure 7:
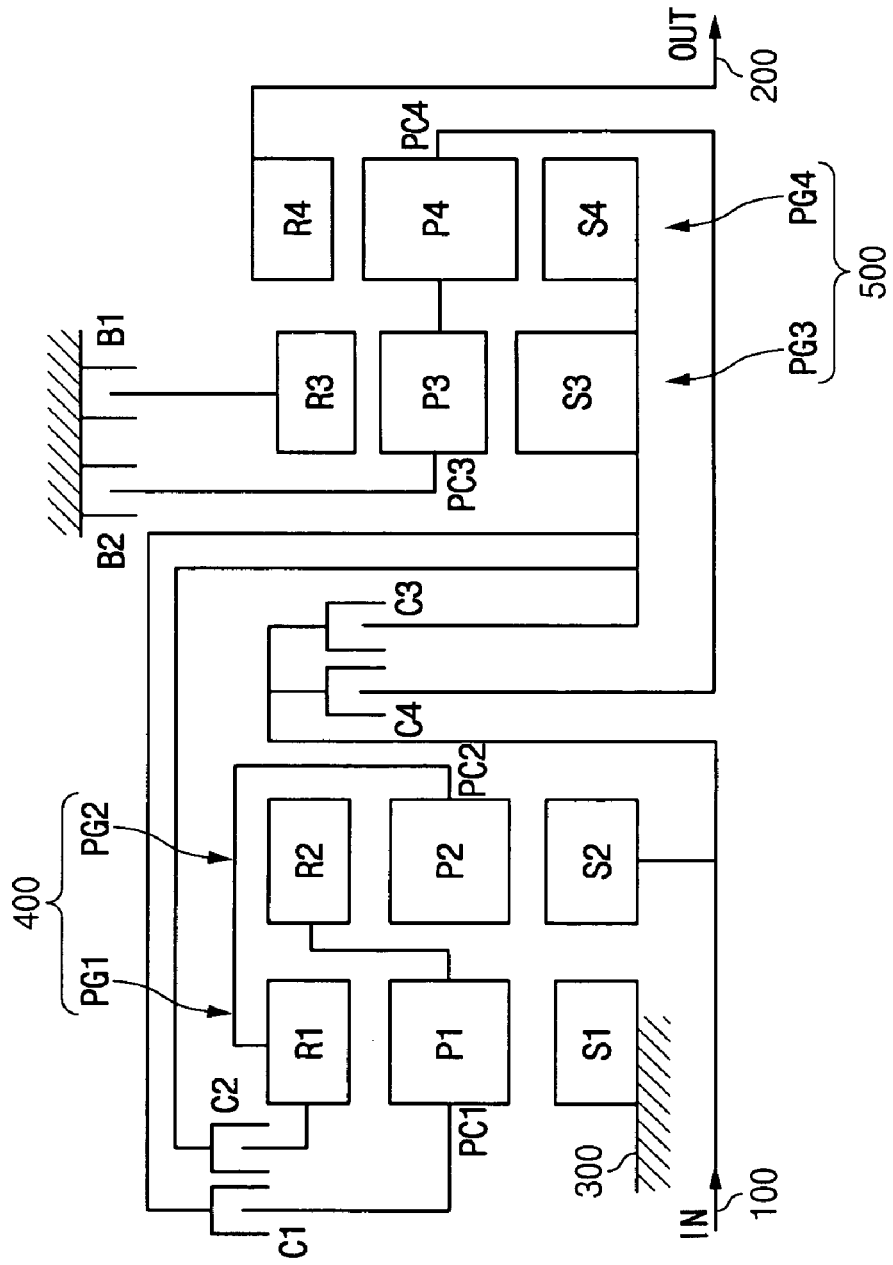

FIG. 7 is a schematic diagram of a power train of an automatic transmission according to a seventh exemplary embodiment of the present invention.

Figure 8:
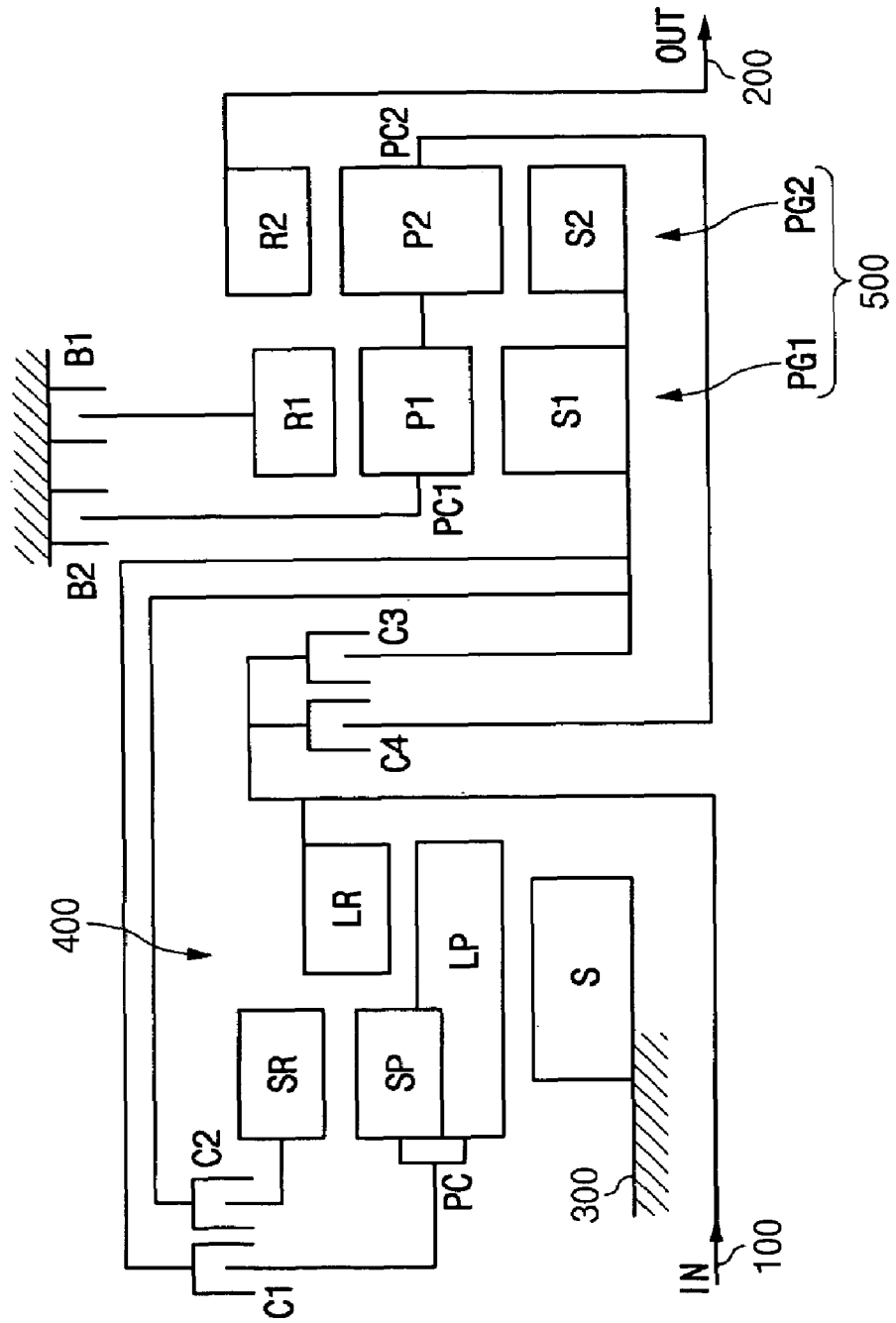

FIG. 8 is a schematic diagram of a power train of an automatic transmission according to a eighth exemplary embodiment of the present invention.

Figure 9:
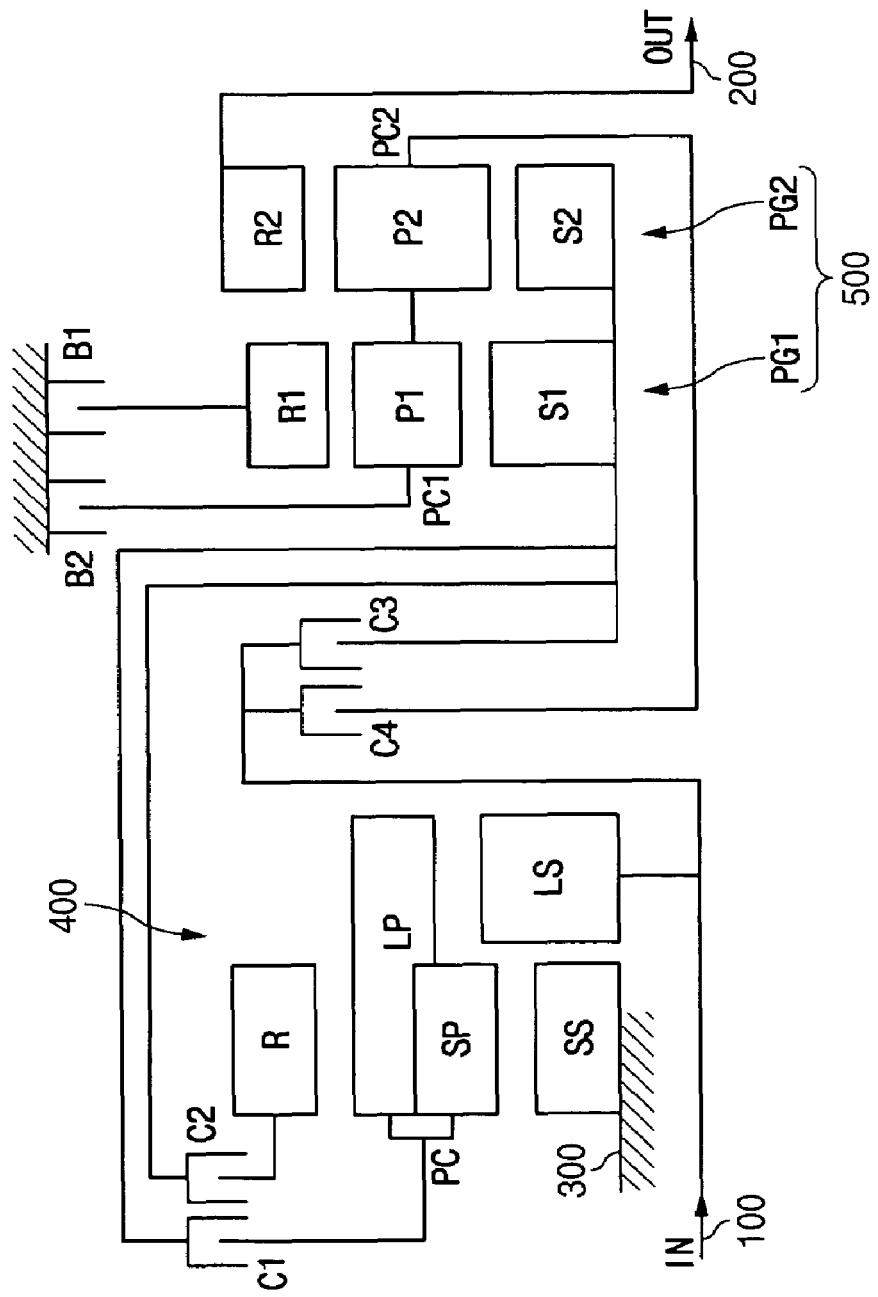

FIG. 9 is a schematic diagram of a power train of an automatic transmission according to a ninth exemplary embodiment of the present invention.

Figure 10:
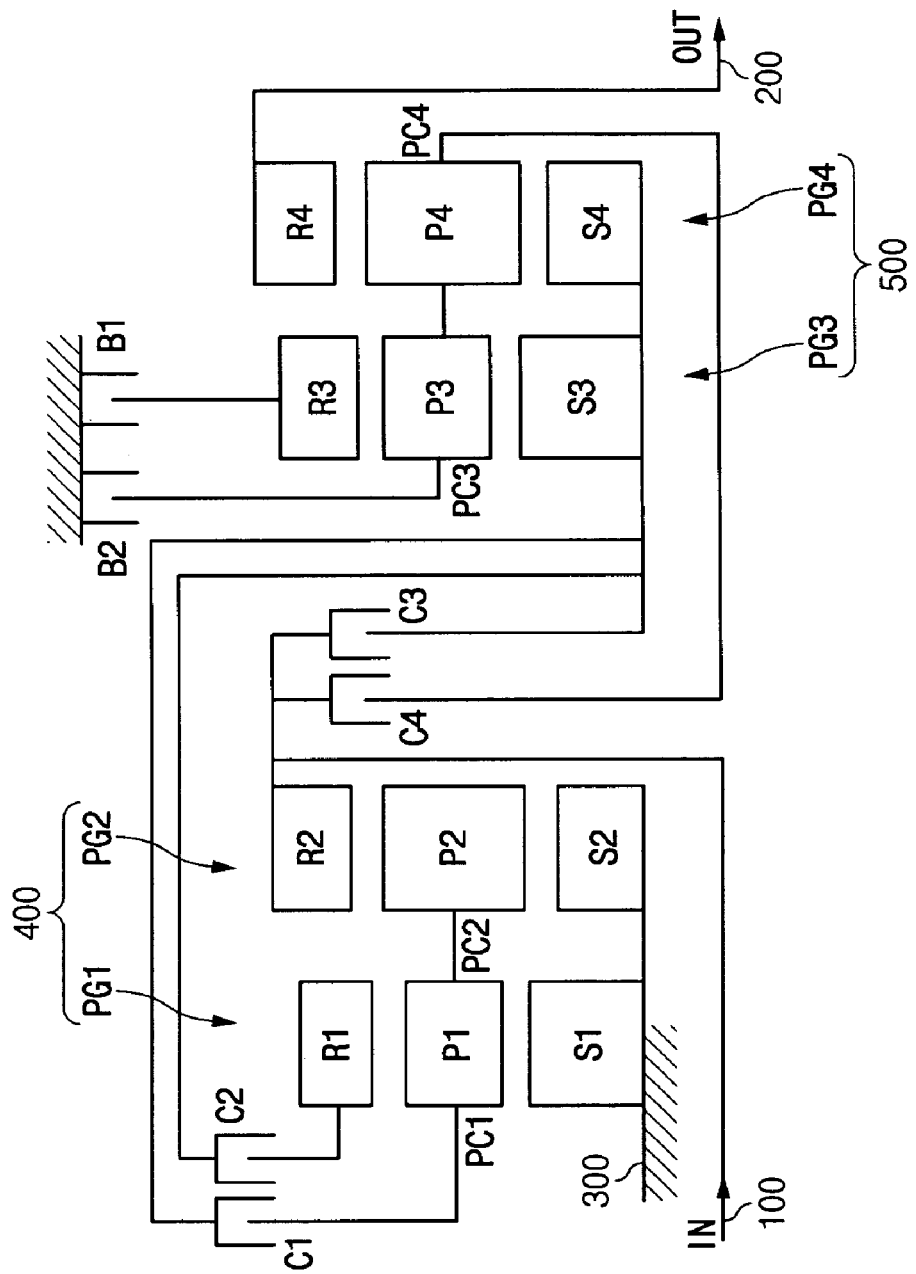

FIG. 10 is a schematic diagram of a power train of an automatic transmission according to a tenth exemplary embodiment of the present invention.

FIG. 11 is an operational chart for a power train of an automatic transmission that realizes seven forward speeds and three reverse speeds according to exemplary embodiments of the present invention.

Figure 12:
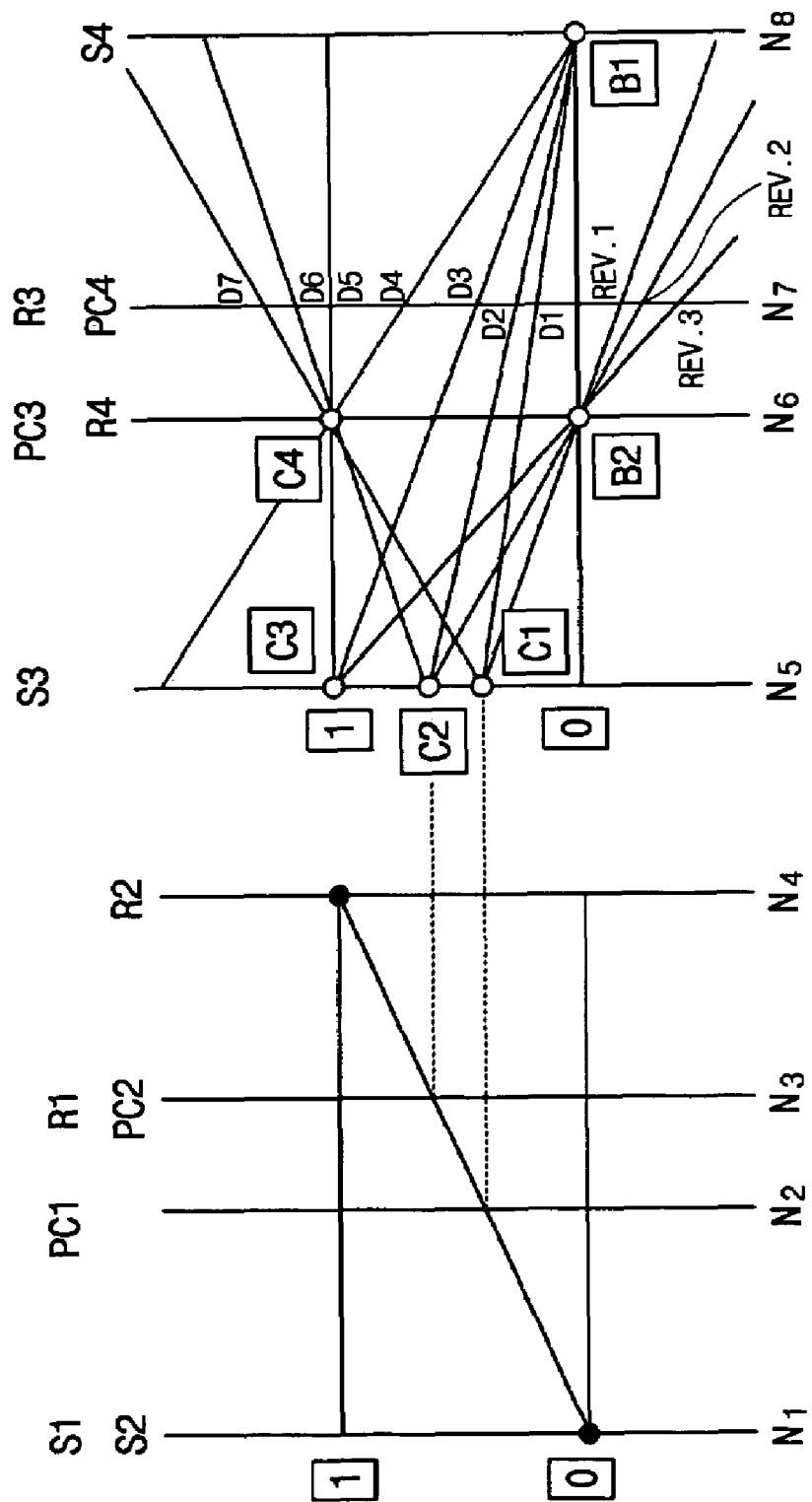

FIG. 12 is a lever diagram showing shifting processes from a first forward speed to a seventh forward speed, and from a first reverse speed to a third reverse speed in a power train of an automatic transmission according to a first embodiment of the present invention.

DETAILED DESCRIPTION OF THE EMBODIMENTS

Hereinafter, referring to the accompanying drawings, exemplary embodiments of the present invention will be described in detail.

As shown in FIG. 1 to FIG. 10, the exemplary power trains of an automatic transmission according to the embodiments of the present invention include an input shaft 100, an output gear 200, a transmission case 300, a speed reduction unit 400, and an output unit 500. The input shaft 100 receives torque from an engine (not shown). The output gear 200 outputs torque from the power train.

The speed reduction unit 400 includes a fixed input member, a fixedly stopped member, and first and second reduced speed output members. The speed reduction unit 400 generates first and second reduced rotational speeds that are smaller than a rotational speed of the input shaft 100 at the first and second reduced speed output members, respectively.

The fixed input member acts as an input member by being fixedly connected to the input shaft 100. The fixedly stopped member acts as a stopped member by being fixedly connected to the transmission case 300.

The first and second reduced speed output members are variably connected to the output unit 500 and transmit the first and second reduced rotational speeds thereto.

The output unit 500 includes first and second variable input members, first and second variably stopped members, and a shift speed output member. The output unit 500 generates seven forward speeds and three reverse speeds at the shift speed output member by operations of the first and second variable input members and the first and second variably stopped members.

The first variable input member is variably connected to the first reduced speed output member via a first clutch C1. Therefore, the first variable input member receives the first reduced rotational speed by an operation of the first clutch C1.

In addition, the first variable input member is variably connected to the second reduced speed output member via a second clutch C2. Therefore, the first variable input member receives the second reduced rotational speed by an operation of the second clutch C2.

In addition, the first variable input member is variably connected to the input shaft 100 via a third clutch C3. Therefore, the first variable input member receives a rotational speed of the input shaft 100 by an operation of the third clutch C3.

The second variable input member is variably connected to the input shaft 100 via a fourth clutch C4. Therefore, the second variable input member receives the rotational speed of the input shaft 100 by an operation of the fourth clutch C4.

The first variably stopped member is variably connected to the transmission case 300 via a first brake B1 and is subjected to a stopping operation of the first brake B1.

The second variably stopped member is variably connected to the transmission case 300 and is subjected to a stopping operation of the second brake B2.

The shift speed output member always acts as an output member by being fixedly connected to the output gear 200.

In addition, according to the exemplary embodiments of the present invention, the input shaft 100 and the output gear 200 are disposed on the same side.

The first and second clutches C1 and C2 are disposed on an opposite side to the output unit 500 with reference to the speed reduction unit 400, and the third and fourth clutches C3 and C4 are disposed between the speed reduction unit 400 and the output unit 500.

Hereinafter, referring to FIG. 1, a power train of an automatic transmission according to the first exemplary embodiment of the present invention will be described in detail.

Figure 1:
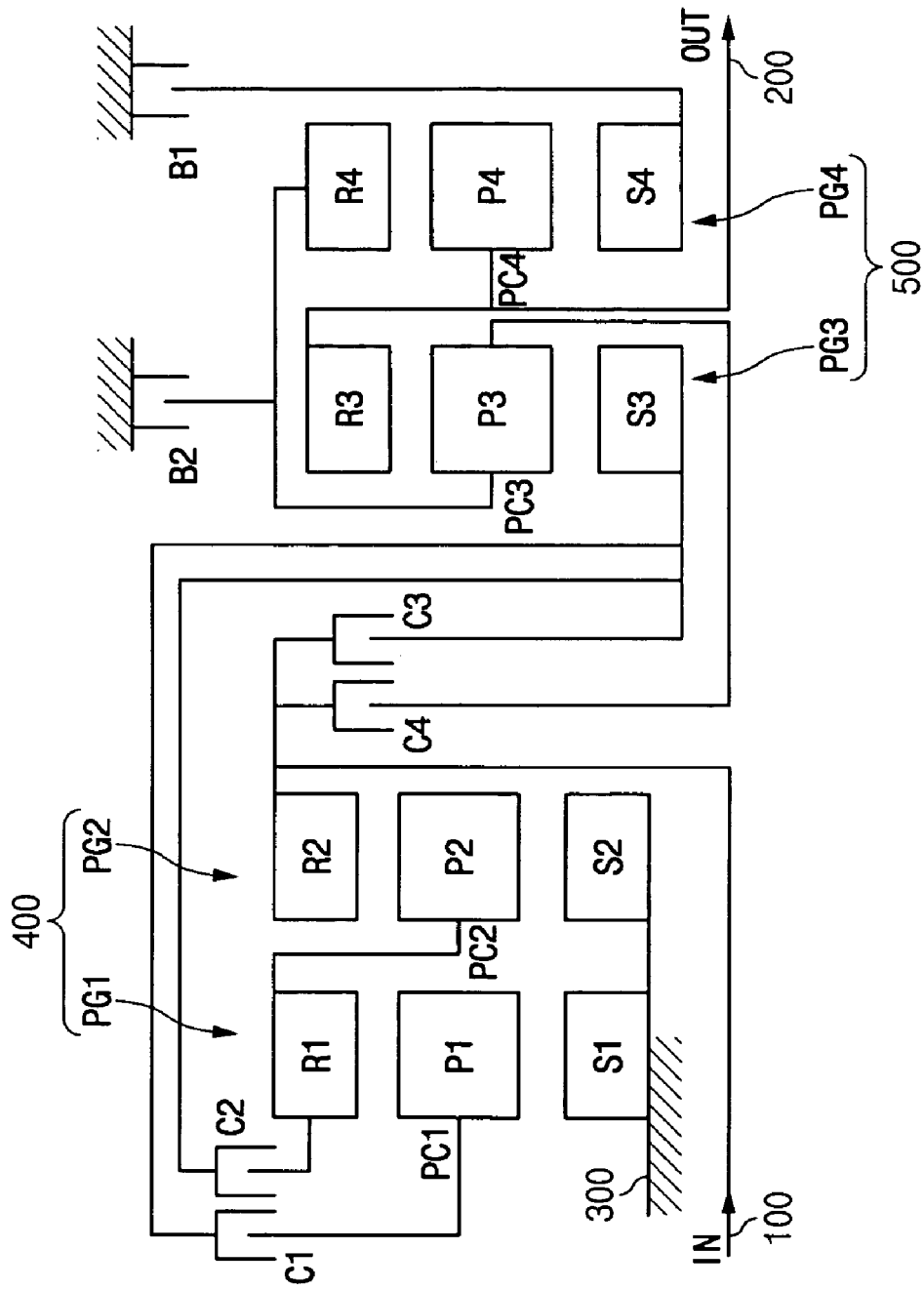
FIG. 1 is a schematic diagram of a power train of an automatic transmission according to a first exemplary embodiment of the present invention.

As shown in FIG. 1, according to the first exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof. A first pinion gear P1, being engaged with both the first ring gear R1 and the first sun gear S1, is connected to and carried by the first planet carrier PC1.

The second planetary gear set PG2 is a single pinion planetary gear set, and includes a second sun gear S2, a second planet carrier PC2, and a second ring gear R2 as operational members thereof. A second pinion gear P2, being engaged both the second ring gear R2 and the second sun gear S2, is connected to and carried by the second planet carrier PC2.

The third planetary gear set PG3 is a single pinion planetary gear set, and includes a third sun gear S3, a third planet carrier PC3, and a third ring gear R3 as operational members thereof. A third pinion gear P3, being engaged with both the third ring gear R3 and the third sun gear S3, is connected to and carried by the third planet carrier PC3.

The fourth planetary gear set PG4 is a single pinion planetary gear set, and includes a fourth sun gear S4, a fourth planet carrier PC4, and a fourth ring gear R4 as operational members thereof. A fourth pinion gear P4, being engaged with both the fourth ring gear R4 and the fourth sun gear S4, is connected to and carried by the fourth planet carrier PC4.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the first exemplary embodiment of the present invention, the second ring gear R2 is operated as the fixed input member, the first sun gear S1 is operated as the fixedly stopped member, the first planet carrier PC1 is operated as the first reduced speed output member, and the first ring gear R1 is operated as the second reduced speed output member.

The first ring gear R1 is fixedly connected to the second planet carrier PC2, and the second sun gear S2 is fixedly connected to the first sun gear S1.

In addition, according to the first exemplary embodiment of the present invention, the third sun gear S3 is operated as the first variable input member, the third planet carrier PC3 is operated as the second variable input member, the fourth sun gear S4 is operated as the first variably stopped member, at least one of the fixedly connected third planet carrier PC3 and the fourth ring gear R4 is operated as the second variably stopped member, and at least one of the fixedly connected fourth planet carrier PC4 and the third ring gear R3 is operated as the shift speed output member.

Hereinafter, operation of a power train according to the first exemplary embodiment of the present invention will be described in detail with reference to the operational chart of FIG. 11.

As shown in FIG. 11, according to the first exemplary embodiment of the present invention, the first clutch C1 and the first brake B1 are operated in a first forward speed D1, the second clutch C2 and the first brake B1 are operated in a second forward speed D2, the third clutch C3 and the first brake B1 are operated in a third forward speed D3, the fourth clutch C4 and the first brake B1 are operated in a fourth forward speed D4, the third and fourth clutches C3 and C4 are operated in a fifth forward speed D5, the second and fourth clutches C2 and C4 are operated in a sixth forward speed D6, and the first and fourth clutches C1 and C4 are operated in a seventh forward speed D7.

In addition, the first clutch C1 and the second brake B2 are operated in a first reverse speed REV. 1, the second clutch C2 and the second brake B2 are operated in a second reverse speed REV. 2, and the third clutch C3 and the second brake B2 are operated in a third reverse speed REV. 3.

Hereinafter, up-shifting processes of the exemplary power train of an automatic transmission according to the first embodiment of the present invention will be described in detail.

In the shifting process from the first forward speed D1 to the second forward speed D2, the first clutch C1 is released and the second clutch C2 is operated.

In the shifting process from the second forward speed D2 to the third forward speed D3, the second clutch C2 is released and the third clutch C3 is operated.

In the shifting process from the third forward speed D3 to the fourth forward speed D4, the third clutch C3 is released and the fourth clutch C4 is operated.

In the shifting process from the fourth forward speed D4 to the fifth forward speed D5, the first brake B1 is released and the third clutch C3 is operated.

In the shifting process from the fifth forward speed D5 to the sixth forward speed D6, the third clutch C3 is released and the second clutch C2 is operated.

In the shifting process from the sixth forward speed D6 to the seventh forward speed D7, the second clutch C2 is released and the first clutch C1 is operated.

Down-shifting processes are reverse processes of the up-shifting processes according to the first exemplary embodiment of the present invention.

Hereinafter, skip down-shifting processes according to the first exemplary embodiment of the present invention will be described in detail.

In a skip down-shifting process from the third forward speed D3 to the first forward speed D1, the third clutch C3 is released and the first clutch C1 is operated.

In a skip down-shifting process from the fourth forward speed D4 to the second forward speed D2, the fourth clutch C4 is released and the second clutch C2 is operated.

In a skip down-shifting process from the fourth forward speed D4 to the first forward speed D1, the fourth clutch C4 is released and the first clutch C1 is operated.

In a skip down-shifting process from the fifth forward speed D5 to the third forward speed D3, the fourth clutch C4 is released and the first brake B1 is operated.

In a skip down-shifting process from the fifth forward speed D5 to the second forward speed D2, a 5→3 shifting and a 3→2 shifting may be performed in sequence or a 5→4 shifting and a 4→2 shifting may be performed in sequence.

In a skip down-shifting process from the sixth forward speed D6 to the fourth forward speed D4, the second clutch C2 is released and the first brake B1 is operated.

In a skip down-shifting process from the sixth forward speed D6 to the third forward speed D3, a 6→5 shifting and a 5→3 shifting may be performed in sequence or a 6→4 shifting and a 4→3 shifting may be performed in sequence.

In a skip down-shifting process from the seventh forward speed D7 to the fifth forward speed D5, the first clutch C1 is released and the third clutch C3 is operated.

In a skip down-shifting process from the seventh forward speed D7 to the fourth forward speed D4, the first clutch C1 is released and the first brake B1 is operated.

Skip up-shifting processes are reverse processes of the skip down-shifting processes according to the first exemplary embodiment of the present invention.

As shown in the lever diagram of FIG. 12, the power train of an automatic transmission according to the first exemplary embodiment of the present invention includes four single pinion planetary gear sets. The first sun gear S1 is fixedly connected to the second sun gear S2, and the first ring gear R1 is fixedly connected to the second planet carrier PC2. The third planet carrier PC3 is fixedly connected to the fourth ring gear R4, and the third ring gear R3 is fixedly connected to the fourth planet carrier PC4. Therefore, operational members of the exemplary power train according to the first embodiment of the present invention are represented as eight nodes in the lever diagram.

Accordingly, the first sun gear S1 and the second sun gear S2 are set to a first node N1, the first planet carrier PC1 is set to a second node N2, the first ring gear R1 and the second planet carrier PC2 are set to a third node N3, the second ring gear R2 is set to a fourth node N4, the third sun gear S3 is set to a fifth node N5, the third planet carrier PC3 and the fourth ring gear R4 are set to a sixth node N6, the third ring gear R3 and the fourth planet carrier PC4 are set to a seventh node N7, and the fourth sun gear S4 is set to an eighth node N8.

As described above, the second ring gear R2 is fixedly connected to the input shaft 100. Therefore, the fourth node N4 of the second ring gear R2 rotates with the same rotational speed as the input shaft 100. In addition, the first sun gear S1 is fixedly connected to the transmission case 300. Therefore, the first node N1 of the first sun gear S1 is always stopped.

Thus, the rotational speed of the engine input through the fourth node N4 is reduced to the first reduced rotational speed at the second node N2 of the first planet carrier PC1 and is reduced to the second reduced rotational speed at the third node N3 of the first ring gear R1 and the second planet carrier PC2 by an operation of the speed reduction unit 400.

In addition, the first planet carrier PC1 is variably connected to the third sun gear S3 via the first clutch C1, and the first ring gear R1 is variably connected to the third sun gear S3 via the second clutch C2. Therefore, the first and second reduced rotational speeds are respectively delivered to the fifth node N5 of the third sun gear S3 by operations of the first and second clutches C1 and C2.

In addition, the third sun gear S3 is variably connected to the input shaft 100 via the third clutch C3. Therefore, the rotational speed of the input shaft 100 is delivered to the fifth-node N5 by an operation of the third clutch C3.

In addition, the third planet carrier PC3 is variably connected to the input shaft 100 via the fourth clutch C4. Therefore, the rotational speed of the input shaft 100 is delivered to the sixth node N6 by an operation of the fourth clutch C4.

In addition, the fourth sun gear S4 is variably connected to the transmission case 300 via the first brake B1. Therefore, the eighth node N8 is stopped by an operation of the first brake B1.

In addition, at least one of the fixedly connected third planet carrier PC3 and the fourth ring gear R4 is variably connected to the transmission case 300 via the second brake B2. Therefore, the sixth node N6 is stopped by an operation of the second brake B2.

In addition, at least one of the fixedly connected third ring gear R3 and the fourth planet carrier PC4 is fixedly connected to the output gear 200. Therefore, the seventh node N7 delivers each shift speed that is generated by operations of the speed reduction unit 400 and the output unit 500 to the output gear 200.

Hereinafter, formation of each speed by the power train of an automatic transmission according to the first exemplary embodiment of the present invention will be described in detail, with reference to FIG. 12.

In the first forward speed D1, the first reduced rotational speed of the second node N2 is delivered to the fifth node N5 by the operation of the first clutch C1. In addition, the eighth node N8 is stopped by the operation of the first brake B1. Therefore, the first forward speed D1 is achieved at the seventh node.N7 that is the shift speed output member.

In the second forward speed D2, the second reduced rotational speed of the third node N3 is delivered to the fifth node N5 by the operation of the second clutch C2. In addition, the eighth node N8 is stopped by the operation of the first brake B1. Therefore, the second forward speed D2 is achieved at the seventh node N7 that is the shift speed output member.

In the third forward speed D3, the rotational speed of the input shaft 100 is delivered to the fifth node N5 by the operation of the third clutch C3. In addition, the eighth node N8 is stopped by the operation of the first brake B1. Therefore, the third forward speed D3 is achieved at the seventh node N7 that is the shift speed output member.

In the fourth forward speed D4, the rotational speed of the input shaft 100 is delivered to the sixth node N6 by the operation of the fourth clutch C4. In addition, the eighth node N8 is stopped by the operation of the first brake B1. Therefore, the fourth forward speed D4 is achieved at the seventh node N7 that is the shift speed output member.

In the fifth forward speed D5, the rotational speed of the input shaft 100 is delivered to the fifth node N5 by the operation of the third clutch C3. In addition, the rotational speed of the input shaft 100 is delivered to the sixth node N6 by the operation of the fourth clutch C4. Therefore, the fifth forward speed D5 is achieved at the seventh node N7 that is the shift speed output member.

In the sixth forward speed D6, the second reduced rotational speed of the third node N3 is delivered to the fifth node N5 by the operation of the second clutch C2. In addition, the rotational speed of the input shaft 100 is delivered to the sixth node N6 by the operation of the fourth clutch C4. Therefore, the sixth forward speed D6 is achieved at the seventh node N7 that is the shift speed output member.

In the seventh forward speed D7, the first reduced rotational speed of the second node N2 is delivered to the fifth node N5 by the operation of the first clutch C1. In addition, the rotational speed of the input shaft 100 is delivered to the sixth node N6 by the operation of the fourth clutch C4. Therefore, the seventh forward speed D7 is achieved at the seventh node N7 that is the shift speed output member.

In the first reverse speed REV. 1, the first reduced rotational speed of the second node N2 is delivered to the fifth node N5 by the operation of the first clutch C1. In addition, the sixth node N6 is stopped by the operation of the second brake B2. Therefore, the first reverse speed REV. 1 is achieved at the seventh node N7 that is the shift speed output member.

In the second reverse speed REV. 2, the second reduced rotational speed of the third node N3 is delivered to the fifth node N5 by the operation of the second clutch C2. In addition, the sixth node N6 is stopped by the operation of the second brake B2. Therefore, the second reverse speed REV. 2 is achieved at the seventh node N7 that is the shift speed output member.

In the third reverse speed REV. 3, the rotational speed of the input shaft 100 is delivered to the fifth node N5 by the operation of the third clutch C3. In addition, the sixth node N6 is stopped by the operation of the second brake B2. Therefore, the third reverse speed REV. 3 is achieved at the seventh node N7 that is the shift speed output member.

As described above, the speed line for each planetary gear set may be easily obtained by a person of an ordinary skill in the art based on the teachings herein.

Hereinafter, referring to FIG. 2, the exemplary power train of an automatic transmission according to the second embodiment of the present invention will be described in detail.

Figure 2:
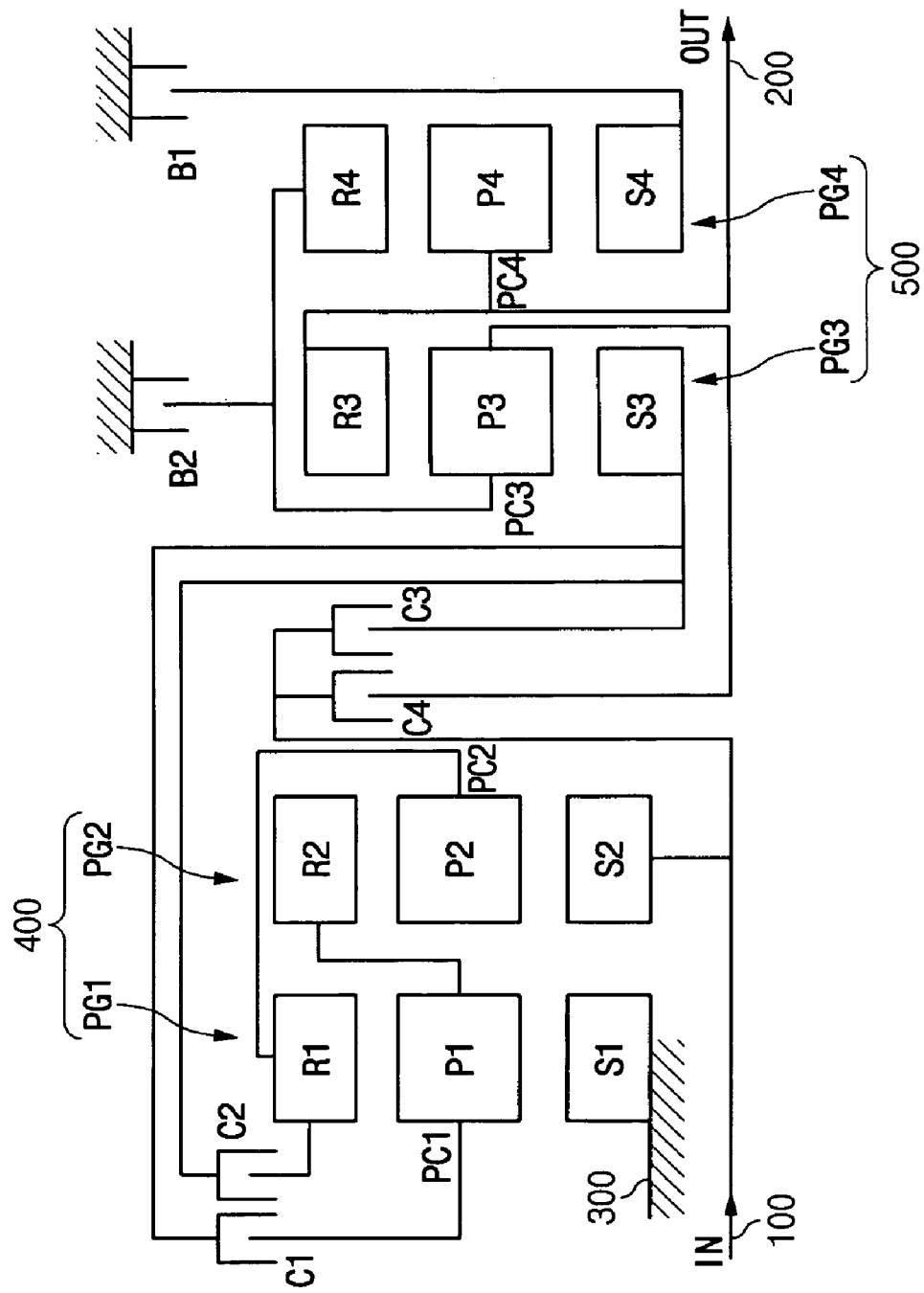
FIG. 2 is a schematic diagram of a power train of an automatic transmission according to a second exemplary embodiment of the present invention.

As shown in FIG. 2, according to the second exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

The third planetary gear set PG3 is a single pinion planetary gear set, and includes a third sun gear S3, a third planet carrier PC3, and a third ring gear R3 as operational members thereof.

The fourth planetary gear set PG4 is a single pinion planetary gear set, and includes a fourth sun gear S4, a fourth planet carrier PC4, and a fourth ring gear R4 as operational members thereof.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the second exemplary embodiment of the present invention, the second sun gear S2 is operated as the fixed input member, the first sun gear S1 is operated as the fixedly stopped member, the first planet carrier PC1 is operated as the first reduced speed output member, and the first ring gear R1 is operated as the second reduced speed output member.

The first planet carrier PC1 is fixedly connected to the second ring gear R2, and the first ring gear R1 is fixedly connected to the second planet carrier PC2.

In addition, according to the second exemplary embodiment of the present invention, the third sun gear S3 is operated as the first variable input member, the third planet carrier PC3 is operated as the second variable input member, the fourth sun gear S4 is operated as the first variably stopped member, at least one of the fixedly connected third planet carrier PC3 and the fourth ring gear R4 is operated as the second variably stopped member, and at least one of the fixedly connected fourth planet carrier PC4 and the third ring gear R3 is operated as the shift speed output member.

Hereinafter, referring to FIG. 3, the power train of an automatic transmission according to the third exemplary embodiment of the present invention will be described in detail.

Figure 3:
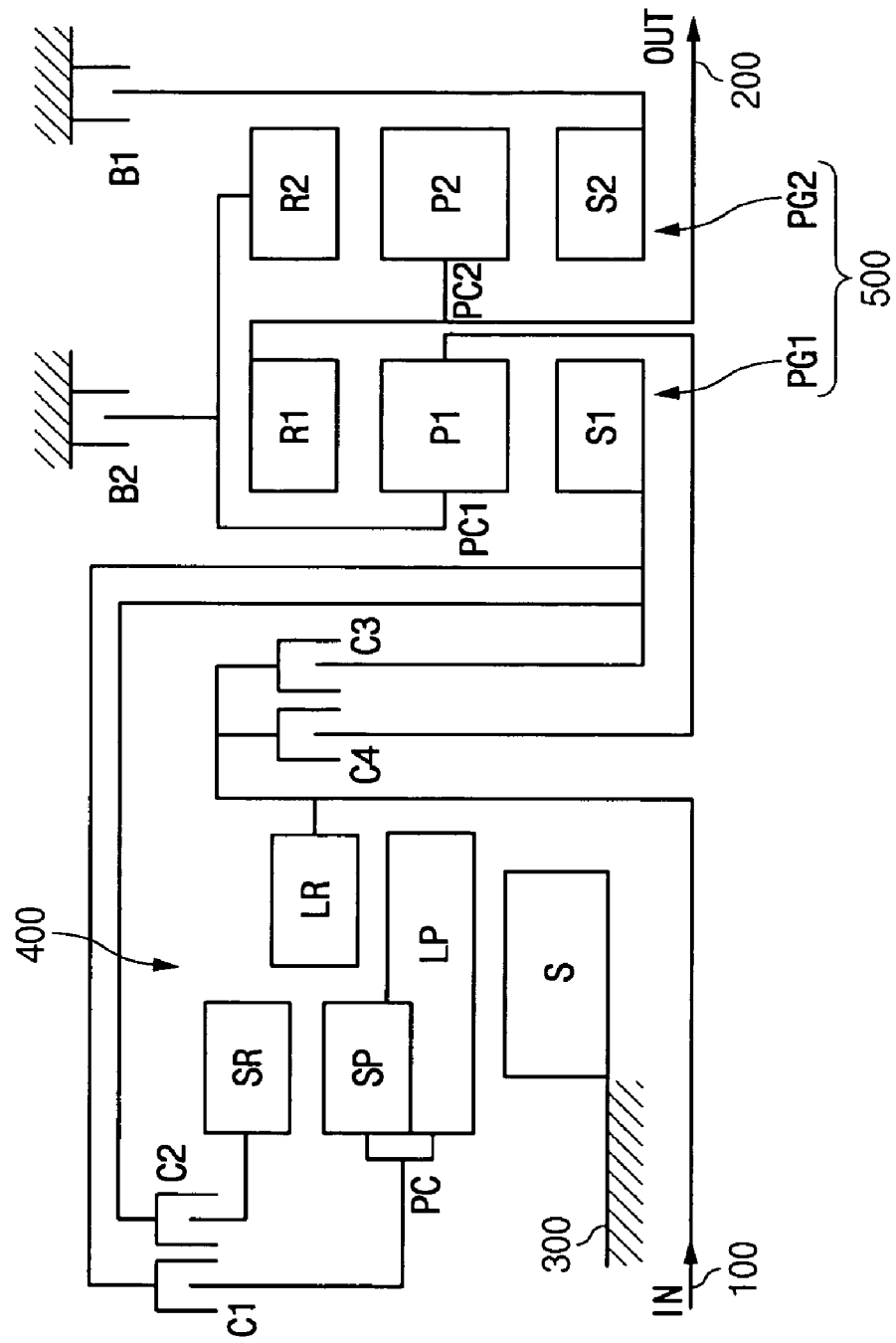
FIG. 3 is a schematic diagram of a power train of an automatic transmission according to a third exemplary embodiment of the present invention.

As shown in FIG. 3, according to the third exemplary embodiment of the present invention, the speed reduction unit 400 includes a compound planetary gear set, and the output unit 500 includes first and second planetary gear sets PG1 and PG2.

The compound planetary gear set includes a long-pinion-side ring gear LR, a short-pinion-side ring gear SR, a compound planet carrier PC, and a compound sun gear S as operational members thereof. A long pinion gear LP, being engaged with both the long-pinion-side ring gear LR and the compound sun gear S, and a short pinion gear SP, being engaged with both the short-pinion-side ring gear SR and the compound sun gear S, are connected to and carried by the compound planet carrier PC.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

In addition, the compound planetary gear set and the first and second planetary gear sets PG1 and PG2 are disposed in a sequence of the compound planetary gear set, the first planetary gear set PG1, and the second planetary gear set PG2.

According to the third exemplary embodiment of the present invention, the long-pinion-side ring gear LR is operated as the fixed input member, the compound sun gear S is operated as the fixedly stopped member, the compound planet carrier PC is operated as the first reduced speed output member, and the short-pinion-side ring gear SR is operated as the second reduced speed output member.

In addition, according to the third exemplary embodiment of the present invention, the first sun gear S1 is operated as the first variable input member, the first planet carrier PC1 is operated as the second variable input member, the second sun gear S2 is operated as the first variably stopped member, at least one of the fixedly connected second ring gear R2 and the first planet carrier PC1 is operated as the second variably stopped member, and at least one of the fixedly connected first ring gear R1 and the second planet carrier PC2 is operated as the shift speed output member.

Hereinafter, referring to FIG. 4, the exemplary power train of an automatic transmission according to a fourth embodiment of the present invention will be described in detail.

Figure 4:
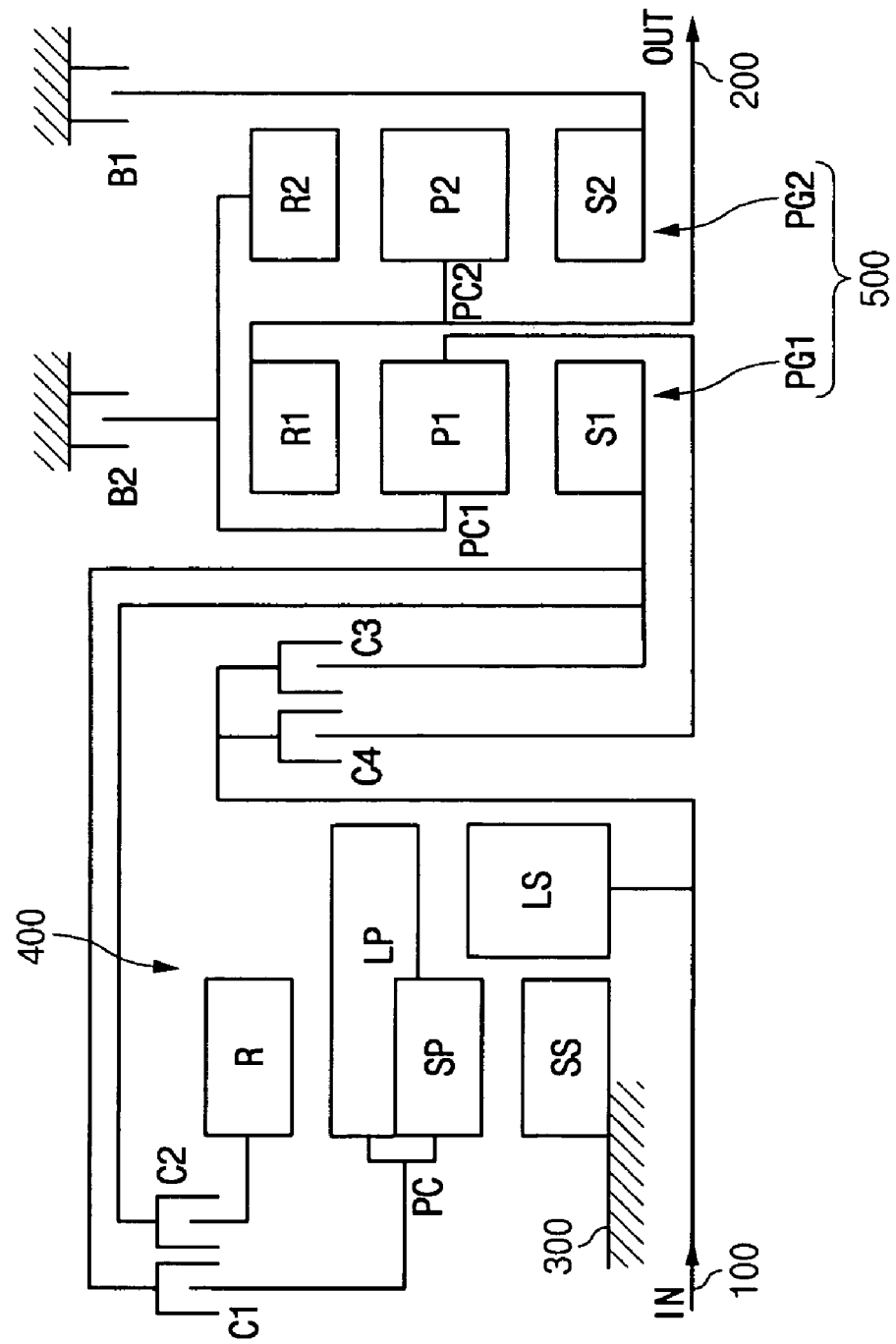
FIG. 4 is a schematic diagram of a power train of an automatic transmission according to a fourth exemplary embodiment of the present invention.

As shown in FIG. 4, according to the fourth exemplary embodiment of the present invention, the speed reduction unit 400 includes a Ravigneaux planetary gear set, and the output unit 500 includes first and second planetary gear sets PG1 and PG2.

The Ravigneaux planetary gear set includes a Ravigneaux ring gear R, a Ravigneaux planet carrier PC, a long-pinion-side sun gear LS, and a short-pinion-side sun gear SS as operational members thereof. A long pinion gear LP, being engaged with both the long-pinion-side sun gear LS and the Ravigneaux ring gear R, and a short pinion gear SP, being engaged with the short-pinion-side sun gear SS and the Ravigneaux ring gear R, are connected to and carried by the Ravigneaux planet carrier PC.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

In addition, the Ravigneaux planetary gear set and the first and second planetary gear sets PG1 and PG2 are disposed in a sequence of the Ravigneaux planetary gear set, the first planetary gear set PG1, and the second planetary gear set PG2.

According to the fourth exemplary embodiment of the present invention, the long-pinion-side sun gear LS is operated as the fixed input member, the short-pinion-side sun gear SS is operated as the fixedly stopped member, the Ravigneaux planet carrier PC is operated as the first reduced speed output member, and the Ravigneaux ring gear R is operated as the second reduced speed output member.

In addition, according to the fourth exemplary embodiment of the present invention, the first sun gear S1 is operated as the first variable input member, the first planet carrier PC1 is operated as the second variable input member, the second sun gear S2 is operated as the first variably stopped member, at least one of the fixedly connected first planet carrier PC1 and the second ring gear R2 is operated as the second variably stopped member, and at least one of the fixedly connected first ring gear R1 and the second planet carrier PC2 is operated as the shift speed output member.

Hereinafter, referring to FIG. 5, the power train of an automatic transmission according to a fifth exemplary embodiment of the present invention will be described in detail.

Figure 5:
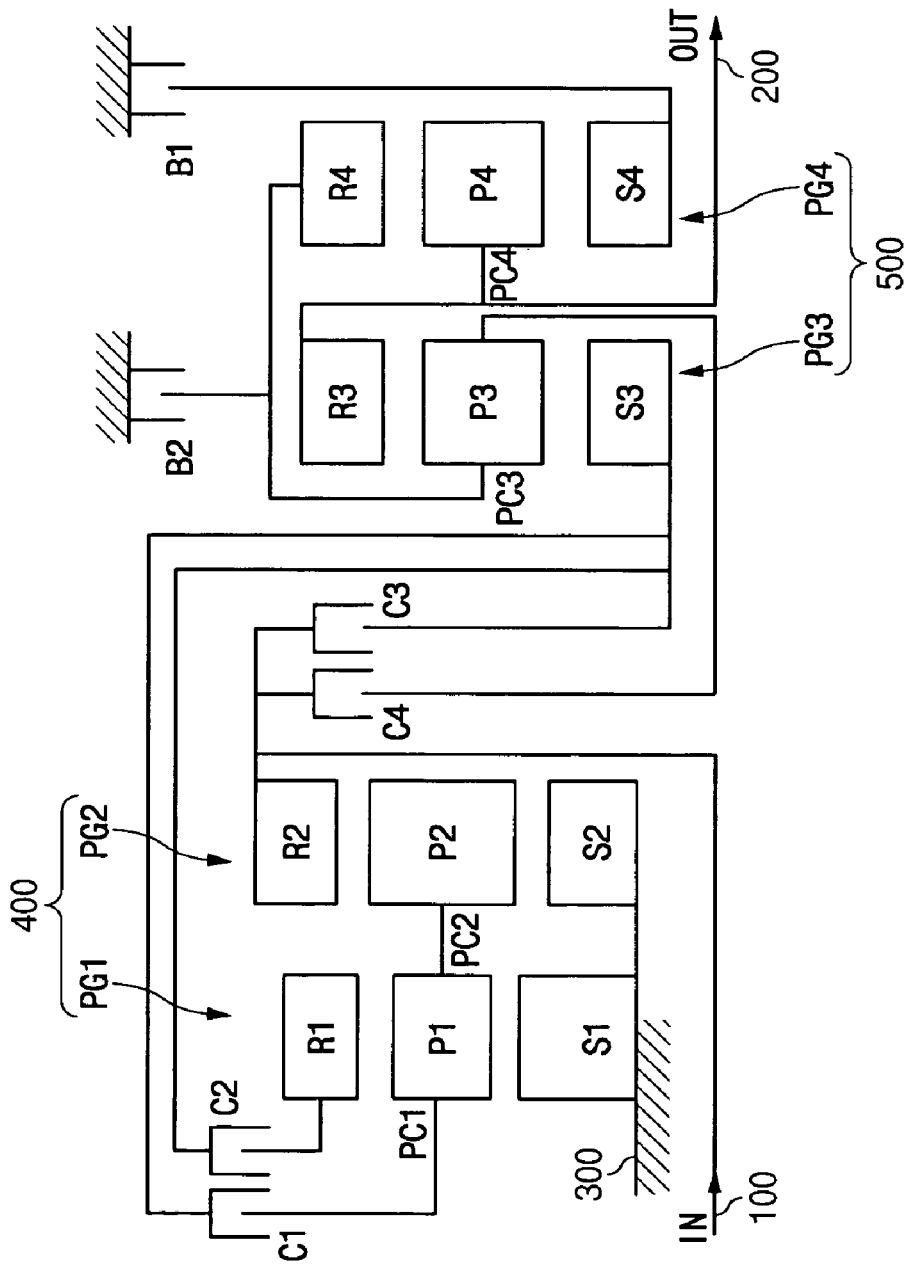

As shown in FIG. 5, according to the fifth exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

The third planetary gear set PG3 is a single pinion planetary gear set, and includes a third sun gear S3, a third planet carrier PC3, and a third ring gear R3 as operational members thereof.

The fourth planetary gear set PG4 is a single pinion planetary gear set, and includes a fourth sun gear S4, a fourth planet carrier PC4, and a fourth ring gear R4 as operational members thereof.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the fifth exemplary embodiment of the present invention, the second ring gear R2 is operated as the fixed input member, the first sun gear S1 is operated as the fixedly stopped member, the first planet carrier PC1 is operated as the first reduced speed output member, and the first ring gear R1 is operated as the second reduced speed output member.

The first planet carrier PC1 is fixedly connected to the second planet carrier PC2, and the first sun gear S1 is fixedly connected to the second sun gear S2.

In addition, according to the fifth exemplary embodiment of the present invention, the third sun gear S3 is operated as the first variable input member, the third planet carrier PC3 is operated as the second variable input member, the fourth sun gear S4 is operated as the first variably stopped member, at least one of the fixedly connected third planet carrier PC3 and the fourth ring gear R4 is operated as the second variably stopped member, and at least one of the fixedly connected fourth planet carrier PC4 and the third ring gear R3 is operated as the shift speed output member.

Hereinafter, referring to FIG. 6, the exemplary power train of an automatic transmission according to a sixth embodiment of the present invention will be described in detail.

As shown in FIG. 6, according to the sixth exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

The third planetary gear set PG3 is a single pinion planetary gear set, and includes a third sun gear S3, a third planet carrier PC3, and a third ring gear R3 as operational members thereof.

The fourth planetary gear set PG4 is a single pinion planetary gear set, and includes a fourth sun gear S4, a fourth planet carrier PC4, and a fourth ring gear R4 as operational members thereof.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the sixth exemplary embodiment of the present invention, the second ring gear R2 is operated as the fixed input member, the first sun gear S1 is operated as the fixedly stopped member, the first planet carrier PC1 is operated as the first reduced speed output member, and the first ring gear R1 is operated as the second reduced speed output member.

The first ring gear R1 is fixedly connected to the second planet carrier PC2, and the second sun gear S2 is fixedly connected to the first sun gear S1.

In addition, according to the sixth exemplary embodiment of the present invention, the third sun gear S3 is operated as the first variable input member, the fourth planet carrier PC4 is operated as the second variable input member, the third ring gear R3 is operated as the first variably stopped member, the third planet carrier PC3 is operated as the second variably stopped member, and the fourth ring gear R4 is operated as the shift speed output member.

The third planet carrier PC3 is fixedly connected to the fourth planet carrier PC4, and the third sun gear S3 is fixedly connected to the fourth sun gear S4.

Hereinafter, referring to FIG. 7, the exemplary power train of an automatic transmission according to a seventh embodiment of the present invention will be described in detail.

As shown in FIG. 7, according to the seventh exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

The third planetary gear set PG3 is a single pinion planetary gear set, and includes a third sun gear S3, a third planet carrier PC3, and a third ring gear R3 as operational members thereof.

The fourth planetary gear set PG4 is a single pinion planetary gear set, and includes a fourth sun gear S4, a fourth planet carrier PC4, and a fourth ring gear R4 as operational members thereof.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the seventh exemplary embodiment of the present invention, the second sun gear S2 is operated as the fixed input member, the first sun gear S1 is operated as the fixedly stopped member, the first planet carrier PC1 is operated as the first reduced speed output member, and the first ring gear R1 is operated as the second reduced speed output member.

The first planet carrier PC1 is fixedly connected to the second ring gear R2, and the first ring gear R1 is fixedly connected to the second planet carrier PC2.

According to the seventh exemplary embodiment of the present invention, the third sun gear S3 is operated as the first variable input member, the fourth planet carrier PC4 is operated as the second variable input member, the third ring gear R3 is operated as the first variably stopped member, the third planet carrier PC3 is operated as the second variably stopped member, and the fourth ring gear R4 is operated as the shift speed output member.

The third planet carrier PC3 is fixedly connected to the fourth planet carrier PC4, and the third sun gear S3 is fixedly connected to the fourth sun gear S4.

Hereinafter, referring to FIG. 8, the exemplary power train of an automatic transmission according to an eighth embodiment of the present invention will be described in detail.

As shown in FIG. 8, according to the eighth exemplary embodiment of the present invention, the speed reduction unit 400 includes a compound planetary gear set, and the output unit 500 includes first and second planetary gear sets PG1 and PG2.

The compound planetary gear set includes a long-pinion-side ring gear LR, a short-pinion-side ring gear SR, a compound planet carrier PC, and a compound sun gear S as operational members thereof. A long pinion gear LP, being engaged with both the long-pinion-side ring gear LR and the compound sun gear S, and a short pinion gear SP, being engaged with both the short-pinion-side ring gear SR and the compound sun gear S, are connected to and carried by the compound planet carrier PC.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

In addition, the compound planetary gear set and the first and second planetary gear sets PG1 and PG2 are disposed in a sequence of the compound planetary gear set, the first planetary gear set PG1, and the second planetary gear set PG2.

According to the eighth exemplary embodiment of the present invention, the long-pinion-side ring gear LR is operated as the fixed input member, the compound sun gear S is operated as the fixedly stopped member, the compound planet carrier PC is operated as the first reduced speed output member, and the short-pinion-side ring gear SR is operated as the second reduced speed output member.

In addition, according to the eighth exemplary embodiment of the present invention, the first sun gear S1 is operated as the first variable input member, the second planet carrier PC2 is operated as the second variable input member, the first ring gear R1 is operated as the first variably stopped member, the first planet carrier PC1 is operated as the second variably stopped member, and the second ring gear R2 is operated as the shift speed output member.

The first planet carrier PC1 is fixedly connected to the second planet carrier PC2, and the first sun gear S1 is fixedly connected to the second sun gear S2.

Hereinafter, referring to FIG. 9, the exemplary power train of an automatic transmission according to a ninth embodiment of the present invention will be described in detail.

As shown in FIG. 9, according to the ninth exemplary embodiment of the present invention, the speed reduction unit 400 includes a Ravigneaux planetary gear set, and the output unit 500 includes first and second planetary gear sets PG1 and PG2.

The Ravigneaux planetary gear set includes a Ravigneaux ring gear R, a Ravigneaux planet carrier PC, a long-pinion-side sun gear LS, and a short-pinion-side sun gear SS as operational members thereof. A long pinion gear LP, being engaged with both the long-pinion-side sun gear LS and the Ravigneaux ring gear R, and a short pinion gear SP, being engaged with the short-pinion-side sun gear SS and the Ravigneaux ring gear R, are connected to and carried by the Ravigneaux planet carrier PC.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

In addition, the Ravigneaux planetary gear set and the first and second planetary gear sets PG1 and PG2 are disposed in a sequence of the Ravigneaux planetary gear set, the first planetary gear set PG1, and the second planetary gear set PG2.

According to the ninth exemplary embodiment of the present invention, the long-pinion-side sun gear LS is operated as the fixed input member, the short-pinion-side sun gear SS is operated as the fixedly stopped member, the Ravigneaux planet carrier PC is operated as the first reduced speed output member, and the Ravigneaux ring gear R is operated as the second reduced speed output member.

In addition, according to the ninth exemplary embodiment of the present invention, the first sun gear S1 is operated as the first variable input member, the second planet carrier PC2 is operated as the second variable input member, the first ring gear R1 is operated as the first variably stopped member, the first planet carrier PC1 is operated as the second variably stopped member, and the second ring gear R2 is operated as the shift speed output member.

The first planet carrier PC1 is fixedly connected to the second planet carrier PC2, and the first sun gear S1 is fixedly connected to the second sun gear S2.

Hereinafter, referring to FIG. 10, the exemplary power train of an automatic transmission according to a tenth embodiment of the present invention will be described in detail.

As shown in FIG. 10, according to the tenth exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

The third planetary gear set PG3 is a single pinion planetary gear set, and includes a third sun gear S3, a third planet carrier PC3, and a third ring gear R3 as operational members thereof.

The fourth planetary gear set PG4 is a single pinion planetary gear set, and includes a fourth sun gear S4, a fourth planet carrier PC4, and a fourth ring gear R4 as operational members thereof.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the tenth exemplary embodiment of the present invention, the second ring gear R2 is operated as the fixed input member, the first sun gear S1 is operated as the fixedly stopped member, the first planet carrier PC1 is operated as the first reduced speed output member, and the first ring gear R1 is operated as the second reduced speed output member.

The first planet carrier PC1 is fixedly connected to the second planet carrier PC2, and the first sun gear S1 is fixedly connected to the second sun gear S2.

In addition, according to the tenth exemplary embodiment of the present invention, the third sun gear S3 is operated as the first variable input member, the fourth planet carrier PC4 is operated as the second variable input member, the third ring gear R3 is operated as the first variably stopped member, the third planet carrier PC3 is operated as the second variably stopped member, and the fourth ring gear R4 is operated as the shift speed output member.

The third planet carrier PC3 is fixedly connected to the fourth planet carrier PC4, and the third sun gear S3 is fixedly connected to the fourth sun gear S4.

Operations, shifting processes, and formations of each speed of the power trains according to the second through tenth embodiments of the present invention are similar to those of the power train according to the first embodiment of the present invention, and may be easily obtained by a person of an ordinary skill in the art based on the teachings herein. Thus, a detailed explanation thereof will be omitted.

According to the exemplary embodiments of the present invention, seven forward speeds and three reverse speeds may be realized.

In addition, according to the exemplary embodiments of the present invention, a skip up-shifting and a skip down-shifting may be facilitated by reducing frictional members engaged or released in a skip shifting process.

In addition, according to the exemplary embodiments of the present invention, length of an automatic transmission may be reduced by effectively arranging clutches and brakes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope or the appended claims.

What is claimed is:

1. A power train of an automatic transmission, comprising:
   an input shaft;
   an output gear;
   a transmission case;
   a speed reduction unit comprising a fixed input member that is fixedly connected to the input shaft, a fixedly stopped member that is fixedly connected to the transmission case, and first and second reduced speed output members that respectively output first and second reduced rotational speeds;
   an output unit comprising a first variable input member that is variably connected to the first and second reduced speed output members and the input shaft, a second variable input member that is variably connected to the input shaft, first and second variably stopped members that are variably connected to the transmission case, and a shift speed output member that always acts as an output member by being fixedly connected to the output gear, wherein the output unit generates seven forward speeds and three reverse speeds at the shift speed output member by operations of the first and second variable input members and the first and second variably stopped members;
   a first clutch for variably connecting the first variable input member to the first reduced speed output member;
   a second clutch for variably connecting the first variable input member to the second reduced speed output member;
   a third clutch for variably connecting the first variable input member to the input shaft;
   a fourth clutch for variably connecting the second variable input member to the input shaft;
   a first brake for variably connecting the first variably stopped member to the transmission case; and
   a second brake for variably connecting the second variably stopped member to the transmission case;
   wherein the speed reduction unit comprises:
      a first planetary gear set having a first sun gear, a first planet carrier, and a first ring gear as operational members thereof; and
      a second planetary gear set having a second sun gear, a second planet carrier, and a second ring gear as operational members thereof,
      wherein the second ring gear is operated as the fixed input member,
      the first sun gear is operated as the fixedly stopped member,
      the first planet carrier is operated as the first reduced speed output member,
      the first ring gear is operated as the second reduced speed output member,
      the first ring gear is fixedly connected to the second planet carrier, and
      the second sun gear is fixedly connected to the first sun gear;
   wherein the output unit comprises:
   a third planetary gear set having a third sun gear, a third planet carrier, and a third ring gear as operational members thereof; and
   a fourth planetary gear set having a fourth sun gear, a fourth planet carrier, and a fourth ring gear as operational members thereof,
   wherein the third sun gear is operated as the first variable input member,
   the third planet carrier is operated as the second variable input member,
   the fourth sun gear is operated as the first variably stopped member,
   at least one of the fixedly connected third planet carrier and the fourth ring gear is operated as the second variably stopped member, and at least one of the fixedly connected fourth planet carrier and the third ring gear is operated as the shift speed output member.

2. The power train of claim 1, wherein the first, second, third, and fourth planetary gear sets are disposed in a sequence of the first planetary gear set, the second planetary gear set, the third planetary gear set, and the fourth planetary gear set.

3. The power train of claim 1, wherein the first and second clutches are disposed on one side of the speed reduction unit opposite to and away from the output unit, and the third and fourth clutches are disposed between the speed reduction unit and the output unit.

4. The power train of claim 1, wherein:
the first clutch and the first brake are operated in a first forward speed;
the second clutch and the first brake are operated in a second forward speed;
the third clutch and the first brake are operated in a third forward speed;
the fourth clutch and the first brake are operated in a fourth forward speed;
the third and fourth clutches are operated in a fifth forward speed;
the second and fourth clutches are operated in a sixth forward speed;
the first and fourth clutches are operated in a seventh forward speed;
the first clutch and the second brake are operated in a first reverse speed;
the second clutch and the second brake are operated in a second reverse speed; and
the third clutch and the second brake are operated in a third reverse speed.

* * * * *